(12) United States Patent
Ukai

(10) Patent No.: US 7,480,494 B2
(45) Date of Patent: Jan. 20, 2009

(54) ANTENNA FAILURE DETECTING DEVICE

(75) Inventor: Yusuke Ukai, Komaki (JP)

(73) Assignee: OMRON Corporation, Kyoto (JP)

( * ) Notice: Subject to any disclaimer, the term of this patent is extended or adjusted under 35 U.S.C. 154(b) by 512 days.

(21) Appl. No.: 11/376,883

(22) Filed: Mar. 16, 2006

(65) Prior Publication Data
US 2006/0214854 A1 Sep. 28, 2006

(30) Foreign Application Priority Data
Mar. 24, 2005 (JP) ............................. 2005-085790

(51) Int. Cl.
*H01Q 11/12* (2006.01)
*H04B 1/06* (2006.01)
(52) U.S. Cl. ...................... 455/117; 455/345; 455/425; 455/575.9
(58) Field of Classification Search .............. 455/67.11, 455/115.1, 117, 226.1, 344, 345, 423, 425, 455/556.1, 575.1, 575.9
See application file for complete search history.

(56) References Cited

U.S. PATENT DOCUMENTS

| | | | |
|---|---|---|---|
| 5,257,407 A | | 10/1993 | Heinzelmann |
| 6,058,297 A | * | 5/2000 | Ekelund ................. 455/277.2 |
| 6,442,379 B2 | * | 8/2002 | Yajima ....................... 455/129 |
| 6,928,281 B2 | * | 8/2005 | Ward et al. .................. 455/423 |
| 7,155,267 B2 | * | 12/2006 | Lee .......................... 455/575.7 |
| 7,200,373 B2 | * | 4/2007 | Dornbusch .................. 455/217 |
| 7,224,170 B2 | * | 5/2007 | Graham et al. ........... 455/67.11 |
| 2004/0116084 A1 | | 6/2004 | Ward et al. |

FOREIGN PATENT DOCUMENTS

| | | |
|---|---|---|
| JP | 2002-319907 | 10/2002 |
| WO | WO-03/096482 A1 | 11/2003 |

OTHER PUBLICATIONS

Patent Abstracts of Japan; Publication No. 2002319907; Publication Date Oct. 31, 2002.
EPO Extended Search Report dated May 23, 2006.

* cited by examiner

*Primary Examiner*—Quochien B Vuong
(74) *Attorney, Agent, or Firm*—Osha•Liang LLP

(57) ABSTRACT

An antenna failure detecting device that can avoid erroneous detection and use a reference voltage of relatively low precision is includes a switch that can short-circuit both the ends of a resistor inserted in a common line. Only when the voltage between both the ends of the resistor is detected, the switch is "disconnected" (off), and when the voltage between both the ends of the resistor is not detected, the switch is "connected" (on). Therefore, the effect of the resistor can be excluded, and the unnecessary loss of the common line at the non-detection time can be eliminated. Furthermore, the resistor is used only at the failure detection time, and thus the resistance value of the resistor can be freely increased. Therefore, a large voltage between both the ends can be taken out, and the permissible range of the reference voltage for failure judgment can be broadened, so that a reference voltage of low precision can be used.

9 Claims, 6 Drawing Sheets

ANTENNA FAILURE DETECTING DEVICE

BACKGROUND OF THE INVENTION

1. Field of the Invention

The present invention relates to an antenna failure detecting device, and more particularly to a device for detecting failure of an antenna which is disposed in the neighborhood of a signal operating circuit such as an amplifier or the like, commonly uses a transmission line of a transmission signal or reception signal or a transmission/ reception signal and a power supply line to the signal operating circuit and contains the signal operating circuit, wire breaking or short-circuit of a common used line, and failure such as breakaway or contact failure of a connecting portion such as a connector or the like when the connecting portion exists in the line concerned.

2. Description of Related Art

In general, an antenna of radio equipment is frequently provided at a place separated from the main body of the radio equipment. The position of the main body of the radio equipment is determined in consideration of resistance to environment, maintenance, operability or connectivity to other electronic equipment, however, the position of the antenna is usually determined by attaching importance to communication performance.

With respect to some radio equipment, a signal operating circuit such as a head amplifier, a pre-amplifier or an end-amplifier may be used to enhance the gain of the antenna. Normally, the signal operating circuit as described above is disposed in the neighborhood of the antenna element. For example, when the signal operating circuit is an amplifier, a more excellent signal-to-noise ration (S/N ratio) is achieved as the signal operating circuit is provided to be nearer to the antenna element.

In an antenna having a signal operating circuit installed therein, it is indispensable to supply power to the signal operating circuit. However, a ling for power supply is commoditized with a transmission line for a transmission signal or reception signal or a transmission/reception signal (hereinafter referred to as common line). By multiplexing DC power supply voltage with high-frequency (AC) transmission signal or reception signal or transmission/reception signal, the number of lines can be reduced and thus the cost can be reduced.

The antenna having the complicated construction as described above is lower in failure resistance than the antenna having a simple construction (only an antenna element and a signal line). This is because it has the signal operating circuit such as the amplifier or the like and thus the number of parts is increased. Furthermore, there is some probability that a trouble such as breaking or short-circuiting of the common line occurs. When a connecting portion such as a connector or the like exists in the common line, there is also some probability that a trouble such as breakaway or contact failure of the connecting portion occurs.

It is needless to say that such a trouble disturbs the operation of the radio equipment, and it is required to detect it and take a required countermeasure (notify or the like) by some method.

FIG. 6 is a conceptual diagram showing a related art (for example, see JP-A-2002-319907). In this figure, a radio equipment body 1 and an antenna 2 are connected to each other through a common line 4 in which a first resistor 3 is inserted. The common line 4 transmits the reception signal of the antenna 2 and the DC power supply voltage V occurring in a power source 5 of the radio equipment body 1 while multiplexing them. The power supply voltage V is applied to both the terminals of a signal operating circuit provided to the antenna 2, for example, a low noise frequency converter (LNB) 6 and a second resistor 7 connected to LNB 6 in parallel. "Z0" affixed to LNB 6 represents impedance of LNB 6, "Z1" affixed to the first resistor 7 represents the value (resistance value) of the first resistor 7, and "Z2" affixed to the second resistor 3 represents the value (resistance value) of the second resistor 3.

In the construction as described above, the voltage Vs across the first resistor 3 is proportional to the load current I flowing in the common line 4, and thus the trouble in the common line 4 or the antenna 2 can be detected on the basis of the across voltage Vs. For example, when wire breaking occurs at some midpoint of the common line 4 (the position of a mark X (P), conveniently), the load current I is equal to zero (the voltage Vs is also equal to zero). Furthermore, when LBN 6 is broken in wire or opened, the impedance of the antenna 2 is equal to Z1, and it is higher than normal one (a parallel value of Z0 and Z1), so that the load current I is reduced (the across voltage Vs is also lowered). Furthermore, when LBN 6 or the common line 4 is short-circuited, the load current I is maximum (the across voltage Vs is also maximum).

Accordingly, when any one state of "across voltage Vs=0", "across voltage Vs<first reference voltage" and "across voltage Vs>second reference voltage" is set, occurrence of a trouble such as wire-breaking or short-circuiting of the common line 4, wire-breaking or opening of LBN 6 or the like can be detected.

However, the conventional antenna failure detecting device as described above has a problem that the line resistance of the common line 4 is large and thus the loss cannot be neglected. This is because the first resistor 3 is inserted in the common line 4 at all times, and the resistance value *Z2) of the first resistor 3 is added to the line resistance of the common line 4 itself. By reducing the value (Z2) of the first resistance 3, the loss can be reduced. However, if the resistance value (Z2) is reduced, the across voltage Vs of the first resistor 3 is also reduced, so that erroneous detection is liable to occur. Furthermore, a high-precision reference voltage (first and second reference voltages) adapted to the minute across voltage Vs must be used, and thus the cost-up is unavoidable.

SUMMARY OF THE INVENTION

Therefore, the present invention has an object to provide an antenna failure detecting device that can use a resistor having a resistance value optimal to failure detection by inserting the resistor only when needed, whereby erroneous detection can be avoided and a reference voltage having relatively low precision can be used.

An antenna failure detecting device according to a first aspect of the invention comprises: an antenna element; a signal operating circuit for carrying out a signal operation on a reception signal received by the antenna element or a transmission signal transmitted from the antenna element in the neighborhood of the antenna element; a common line for multiplexing a power supply voltage of the signal operating circuit and the reception signal signal-operated by the signal operating circuit or the transmission signal supplied to the signal operating circuit and then transmitting the signals thus multiplexed; a resistor inserted in the common line; switch means that can short-circuit both the ends of the resistor; and judging means for judging the presence or absence of a failure of the antenna element, the signal operating circuit or the common line. "short-circuit" means that two points are electrically connected to each other by a low resistance value. This is also called as "short". The ideal resistance value under short-circuit is equal to 0Ω, however, the present invention is not limited to this value. If the resistance value is equal to 1 to several Ω, it contains short-circuiting if the value is remarkably smaller than the value of the resistor. "remarkably" should be judged on the basis of whether the object of the present invention can be achieved or not.

According to the first aspect of the invention, the presence or absence of the failure of the antenna element, the signal operating circuit or the common line is judged on the basis of the voltage across the resistor inserted in the common line. Here, when no failure occurs in each of the antenna element, the signal operating circuit and the common line, the voltage across the resistor indicates a normal voltage corresponding to the product between current flowing in the common line and the resistance value, and when a failure occurs in any one of them, the voltage across the resistor indicates an abnormal voltage containing 0V which is deviated from the normal voltage. Accordingly, the presence or absence of the failure can be judged by monitoring the voltage across the resistor. In addition, in the construction of the present invention, the switch means for short-circuiting both the ends of the resistor is provided, and the switch means can be set to "disconnection" (OFF) only when the voltage across the resistor is detected. Therefore, when the voltage across the resistor is not detected, the switch means is set to "connection" (ON), that is, to the short-circuit state, whereby the effect of the resistor can be excluded, and unnecessary loss of the common line at the failure non-detection time can be eliminated. Furthermore, the resistor is used only at the failure detection time, and thus the resistance value thereof can be freely increased. Therefore, the large across voltage can be taken out, and the permissible range of the reference voltage for judging the failure can be broadened, and the reference voltage of low precision can be used.

A second aspect of the invention is according to the first aspect of the invention, wherein control means for controlling ON/OFF of the switch means is provided, and the control means keeps the switch means to ON, and sets the switch means to OFF when the antenna element is not used for communication.

In the second aspect of the invention, when the antenna element is not used for communication, that is, only during only non-communication period, the switch means is set to OFF (non-short-circuit state), and thus there occurs no effect of the resistor on the communication.

An antenna failure detecting device of a third aspect of the invention is equipped with an antenna element mounted in a vehicle, a signal operating circuit for conducting a signal operation on a reception signal received by the antenna or a transmission signal transmitted from the antenna in the neighborhood of the antenna element, a common line for multiplexing a power supply voltage of the signal operating circuit with the signal-operated reception signal by the signal operating circuit or the transmission signal supplied to the signal operating circuit and then transmitting the multiplexed signal, a resistor inserted in the common line, switch means that can short-circuit both the ends of the resistor, judging means for judging the presence or absence of a failure of the antenna element, the signal operating circuit or the common line on the basis of the voltage across the resistor, and control means for controlling ON/OFF of the switch means, wherein the control means keeps the switch means to ON and sets the switch means to OFF when the antenna element is not used for communication.

In the third aspect of the invention, a failure of radio equipment mounted in a vehicle which is used under a harsh environment such as vibration or the like can be judged, and thus the reliability of the radio equipment can be enhanced.

An antenna failure detecting device according to a fourth aspect of the invention is equipped with an antenna element mounted in a vehicle, a signal operating circuit for conducting a signal operation on a reception signal received by the antenna or a transmission signal transmitted from the antenna in the neighborhood of the antenna element, a common line for multiplexing a power supply voltage of the signal operating circuit with the signal-operated reception signal by the signal operating circuit or the transmission signal supplied to the signal operating circuit and then transmitting the multiplexed signal, a resistor inserted in the common line, switch means that can short-circuit both the ends of the resistor, judging means for judging the presence or absence of a failure of the antenna element, the signal operating circuit or the common line on the basis of the voltage across the resistor, and control means for controlling ON/OFF of the switch means, wherein the antenna element, the signal operating circuit, the common line, the resistor, the switch means, the judging means and the control means are constituent parts of a theft preventing device, a tire air pressure detecting device or a keyless entry system of the vehicle, and the control means keeps the switch means to ON and sets the switch means to OFF when a predetermined user operation is carried out on the theft preventing device, the tire air pressure detecting device or the keyless entry system.

According to the fourth aspect of the invention, in response to the predetermined user operation on the theft preventing device, the tire air pressure detecting device or the keyless entry system mounted in the vehicle, the failure detection of the radio equipment as a constituent part of the theft preventing device, the tire air pressure detecting device or the keyless entry system is carried out. Therefore, in response to the frequency of the user operation, the frequency of the failure detection can be reduced, the unnecessary loss by the resistor is eliminated, and the effect of avoiding the unnecessary power consumption and the loss of the signal current can be enhanced at maximum.

A fifth aspect of the invention is according to the antenna failure detecting device of the fourth aspect, wherein the predetermined user operation is an operation of starting a theft preventing function of the vehicle.

According to fifth aspect of the invention, the failure detection is carried out in response to the operation of starting the theft preventing function of the vehicle. In general, the start operation of the theft preventing function is carried out only once when the driving of the vehicle is finished, and thus the frequency of the failure detection can be minimized.

A sixth aspect of the invention is according to the antenna failure detecting device of the fifth aspect, wherein the judging means contains recording means for recording the judgment result in a non-volatile mode.

According to the sixth aspect of the invention, the result of the judgment can be recorded in non-volatile mode, and thus notification of the failure can be left as a record even after an ignition key is set to OFF. Therefore, the troubleshooting efficiency in a factory or the like can be enhanced.

A seventh aspect of the invention is according to the antenna failure detecting device of any one of the first, third and fourth aspects, wherein the antenna element has a coil, a capacitor connected to the coil in series, and a resistor connected to the capacitor in parallel.

According to the seventh aspect of the invention, the capacitor is connected to a coil of the antenna element in series, and the resistor is connected to the capacitor. Accordingly, signal current of the antenna element flows through the resistor. Therefore, when only the capacitor is provided, variation of the signal current occurs in concert with the charging/discharging cycle of the capacitor, and stable failure detection cannot be performed. However, by connecting the resistor in parallel, this variation can be suppressed and the failure detection can be stabilized.

The construction of the present invention is equipped with the switch means that can short-circuit both the ends of the resistor inserted in the common line. Therefore, the switch means can be "disconnected" (OFF) only when the voltage across the resistor is detected. Accordingly, when the voltage across the resistor is not detected, the switch means is "connected" (ON), so that the effect of the resistor can be excluded, and unnecessary loss of the common line at the non-detection time can be eliminated. Furthermore, the resistor is used only when the failure is detected, and thus the resistance value can be freely increased. Therefore, a large across voltage can be taken out, and the permissible range of the reference voltage for the failure judgment can be broadened to thereby enable use of a low-precision reference voltage.

DESCRIPTION OF PREFERRED EMBODIMENTS

Embodiments according to the present invention will be described. It is apparent that various detailed portions specified or embedded in the following description and examples of numerical values, character arrays and other symbols are described merely for reference to clarify the ideal of the present invention, and thus the present invention is not limited by all or some of them. With respect to well-known methods, well-known procedures, well-known architectures, well-known circuit constructions, etc. (hereinafter referred to as "well-known matters"), the detailed description on these well-known matters is avoided, and this is also to simplify the description. Therefore, all or some of these well-known matters are not intentionally excluded. These well-known matters can be known by persons skilled in the art at the time when the application of this invention is filed, and thus they are necessarily contained in the following description.

Figure 1:
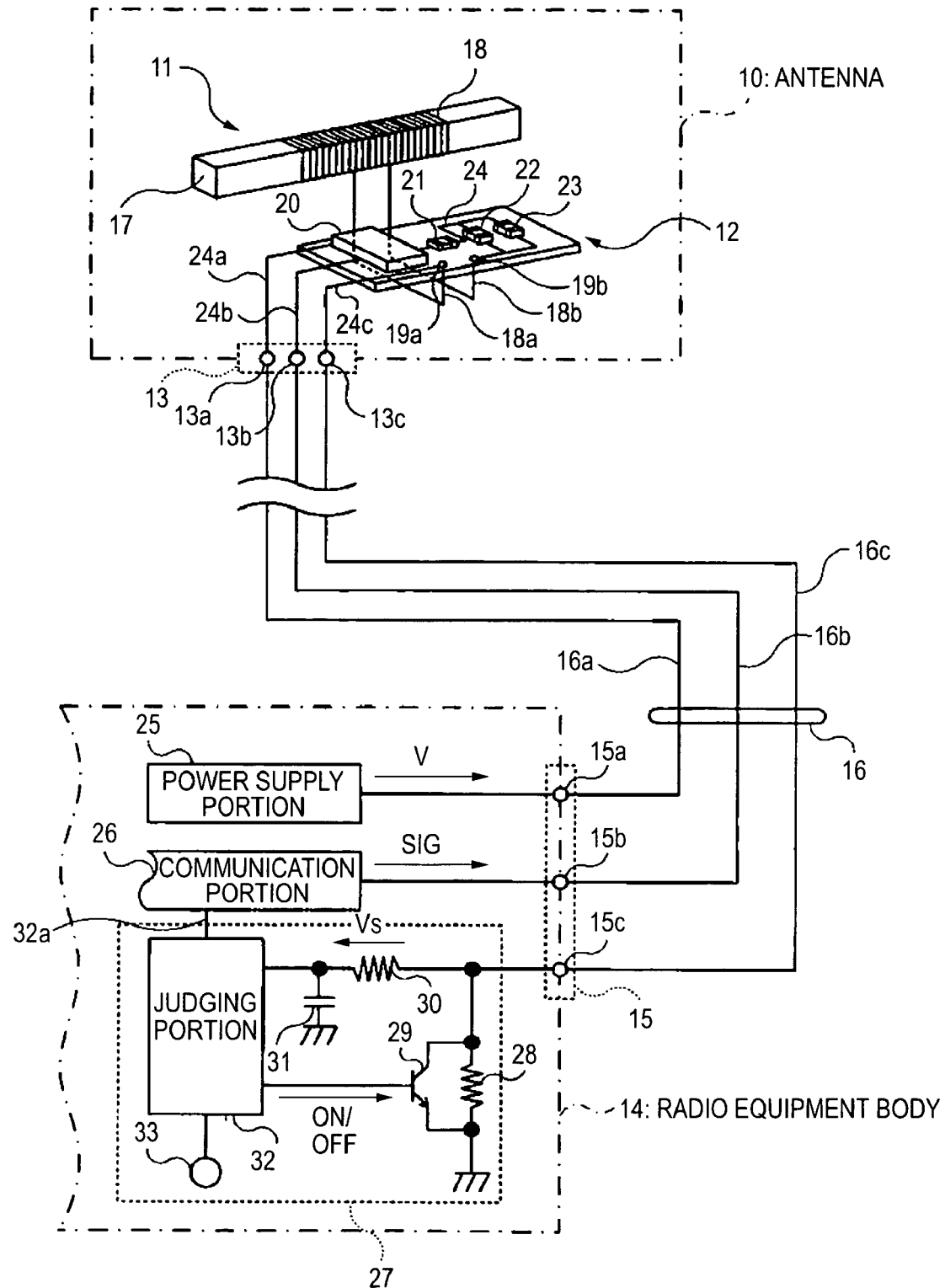
FIG. 1 is a diagram showing a system construction containing an antenna failure detecting device of an embodiment.

FIG. 1 is a diagram showing the system construction containing an antenna failure detecting device according to an embodiment. In FIG. 1, an antenna 10 contains an antenna element 11 and an electronic board 12, and a detachable connector 13 of the antenna 10 and a detachable connector 15 of a radio equipment body 14 are connected to each other through a line group 16 having any length achieved by bundling plural (three in the figure) lines 16a to 16c.

The antenna element 11 is a so-called ferrite bar antenna achieved by winding a coil 18 around rod-shaped dielectric material (hereinafter referred to as ferrite bar 17). The ferrite bar 17 serves to multiply the inductance of the coil 18 and reduce the number of turns of the coil 18. For example, when the effective magnetic permeability of the ferrite bar 17 is represented by µe, the inductance of the coil 18 is increased to the multiplication of µe, so that the number of turns can be reduced and the antenna element 11 can be miniaturized.

Both the ends 18a, 18b of the coil 18 are connected to the terminals 19a, 19b of the electronic board 12. Various electronic parts, for example, an amplifier 20 (signal operating circuit), a first resistor 21, a second resistor 22 (resistance), a first capacitor. 23 (capacitor), etc. are mounted on the surface of the electronic board 12, and these parts are connected to one another by a print wire 24. The connection among the parts will be described later.

The print wire 24 is drawn out from the electronic board 12 by three lead wires 24a to 24c, and the respective three lead wires 24a to 24c are connected to the terminals 13a to 13c of the antenna 10, respectively.

One ends of the three lines 16a to 16c of the line group 16 are connected to the terminals 13a to 13c of the connector 13 of the antenna 10, and the other ends thereof are connected to the terminals 15a to 15c of the connector 15 of the radio equipment body 14.

The radio equipment body 14 contains a power supply portion 25, a communication portion 26 and a failure detector 27. The power supply portion 25 generates a DC power supply voltage V, and outputs the power supply voltage V through the terminal 15a of the connector 5, the line 16a of the line group 16, the terminal 13a of the connector 13 of the antenna 10 and the lead line 24a to the amplifier 20 to drive the amplifier 20.

The communication portion 26 (in the following description, it is used as one for transmission for the convenience of description, however, the communication portion 26 is not limited to this embodiment) outputs a transmission signal SIG having a predetermined frequency band through terminal 15b of the connector 15, the line 16b of the line group 16, the terminal 13b of the connector 13 and the lead line 24b to the amplifier 20, the transmission signal SIG being created in a transmission data generator (not shown) and modulated by a modulator (not shown). The transmission signal SIG is amplified by the amplifier 20, and radiated from antenna element 11 to the space.

The failure detector 27 is equipped with a third resistor 28 (resistor) connected between the terminal 15c of the connector 15 and the ground, a switching transistor 29 (switch means) whose collector and emitter are connected to both the ends of the third resistor 28, a fourth resistor 30 connected between the terminal 15c of the connector 15 and the ground in series, and a second capacitor 31. The failure detector 27 is further equipped with a judging portion 32 (judging means, control means) for taking in the voltage across the third resistor 28 as a failure judging signal Vs, and judging a failure of the antenna 10 containing the line group 16 on the basis of the failure judging signal Vs, and notifying means 33 for notifying the judgment result visually, acoustically or in other manners, such as LED (Light Emitting Diode) or the like.

The judging portion 32 generates a predetermined control signal (hereinafter referred to as an on/off signal ON/OFF), and applied the on/off signal ON/OFF to the base of the switching transistor 29. The switching transistor 29 sets a low-resistance state (conduction state) between the collector and the emitter when the on/off signal ON/OFF is active (ON), and sets a high-resistance state (interrupt state) when the on/off signal ON/OFF is inactive (OFF).

Figure 2:
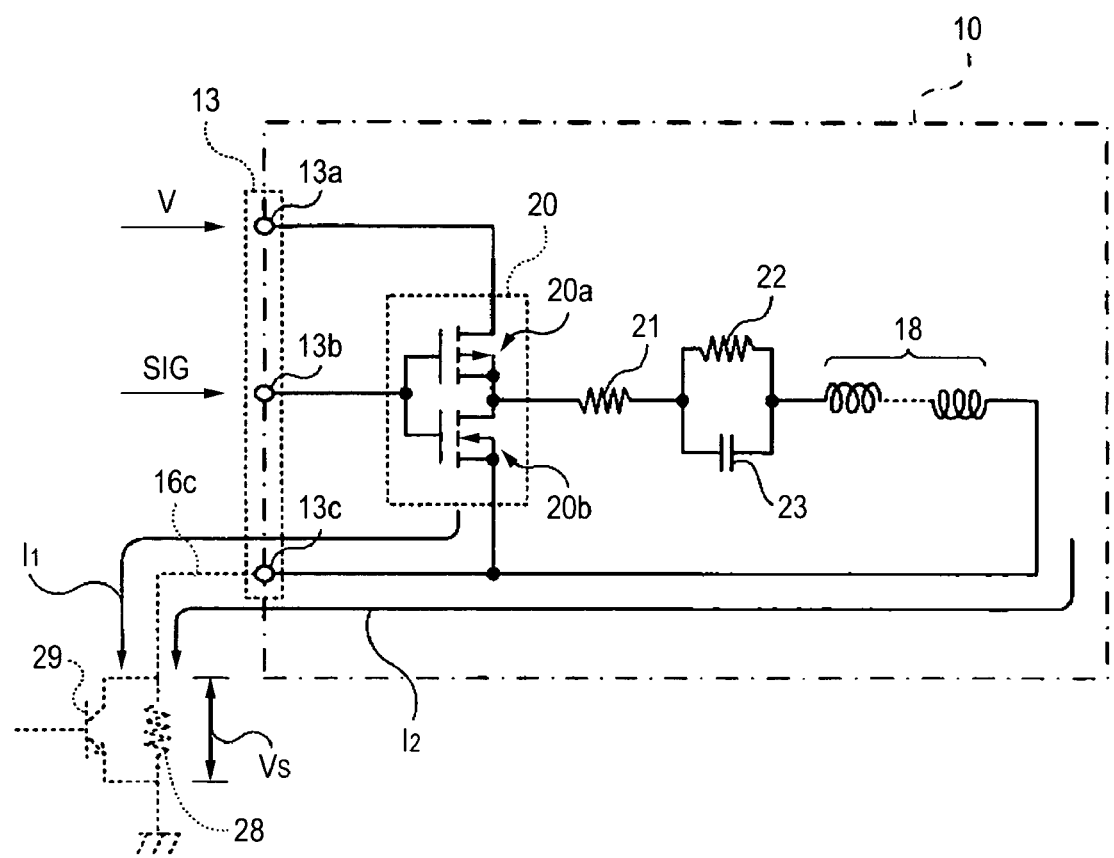
FIG. 2 is a circuit diagram showing an antenna 10 containing a part of a failure detector 27.

FIG. 2 is a circuit diagram showing the antenna 10 containing a part of the failure detector 27. In FIG. 2, not particularly specified, the amplifier 20 is a general-purpose amplifier having a C-MOS (Complementary-MOS) structure in which an enhancement type P-channel MOS-FET (Metal Oxide Semiconductor Field Effect Transistor) 20a and an N-channel MOS-FET 20b are formed on a common chip so as to be cascade-connected to each other.

The power supply voltage V from the radio equipment body 14 is applied between the source of the P-channel MOS-FET 20a and the drain of the N-channel MOS-FET 20b, and a transmission signal SIG from the radio equipment body 14 is applied the common gate of the two MOS-FETs 20a and 20b. The drain current $I_1$ of the MOS-FET 20a, 20b is finally applied to the third resistor 28 of the failure detector 27 and the collector of the switching transistor 29 through the line 16c of the line group 16. The drain current $I_1$ passes through the resistor between the collector and the emitter and reaches the ground when the switching transistor 29 is set to ON (under low resistance state), and passes through the third resistor 28 and reaches the ground when the switching transistor 29 is set to OFF (under high resistance state).

When the resistance between the collector and emitter of the switching transistor 29 is represented by $R_{29}$ for convenience, when the switching transistor 29 is set to ON, $R_{29}$ is remarkably smaller than the value of the third resistor 28 ($R_{28}$ for convenience). When the switching transistor 29 is set to OFF, $R_{29}$ is remarkably larger than the value $R_{28}$ of the third resistor 28. Accordingly, as is known by its name, the switching transistor 29 of this embodiment operates as a simple ON/OFF switch, however, the switching transistor 29 may be replaced by another switching element, for example, a relay or the like, or it may be replaced by another active element such as FET or the like.

In addition, reception current $I_2$ from the antenna flows into the switching transistor 29 and the third resistor 28. That is, the amplified transmission signal SIG taken out from the drain of the P-channel MOS-FET 20a (the source of the N-channel MOS-FET 20b) is passed through the parallel circuit of the first resistor 21, the second resistor 22 and the first capacitor 23 and the coil 18, then passed through the line 16c of the line group 16, and finally added to the third resistor 28 of the failure detector 27 and the collector of the switching transistor 29. As in the case of the drain current $I_1$, the reception current $I_2$ also passes through the resistor $R_{29}$ between the collector and emitter of the switching transistor 29, and reaches the ground when the switching transistor 29 is set to ON (low resistance state: short-circuited state), and it passes through the third resistor 28 and reaches the ground when the switching transistor 29 is set to OFF (high resistance state).

Accordingly, the line group 16 containing the line 16c is a "common line" commonly used by the power supply current ($I_1$) and the signal current ($I_2$).

When the switching transistor 29 is set to OFF, the voltage corresponding to the addition current of the power supply current ($I_1$) and the signal current ($I_2$) occurs between both the ends of the third resistor 28. The judging portion 32 takes this across voltage as a failure judging signal Vs, and judges the failure of the antenna 10 containing the line group 16 on the basis of the failure judging signal Vs.

Figure 3:
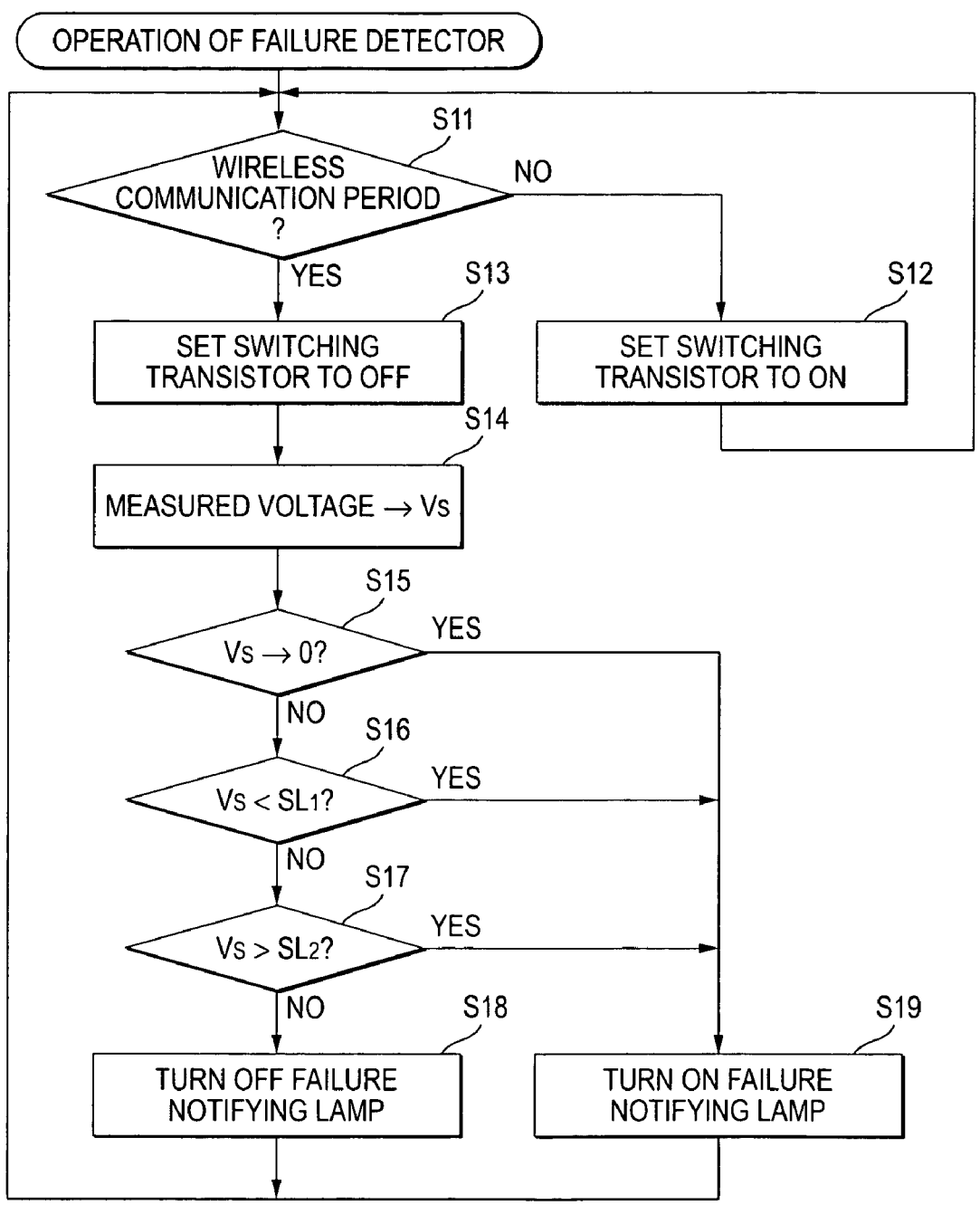
FIG. 3 is a diagram showing the operation of the failure detector 27.

FIG. 3 is a diagram showing the operation of the failure detector 27. The failure detector 27 normally activates the on/off signal ON/OFF to be applied to the base of the switching transistor 29 and sets the low-resistance state between the collector and emitter of the switching transistor 29 during this period (step S12). However, it identifies the timing at which no trouble occurs in communication (for example, non-communication period) by monitoring the operation status of the communication portion 26 through a line 32a or the like (step S11), the failure detector 27 inactivates the on/off signal ON/OFF, and sets the high-resistance state between the collector and emitter of the switching transistor 29 (step S13).

The voltage across the third resistor 28 under the high-resistance state is taken in as the failure detection signal Vs (step S14), and it is judged whether $V_s=0$ (step S15), $Vs<SL_1$ (step S16) or $Vs>SL_2$ (step S17), and if there is no satisfied condition, it is judged that no failure occurs in the antenna 10 containing the line group 16, and the notifying state of the notifying means 33 is released (for example, when the notifying means 33 is LED, it is turned off) (step S18). Thereafter, the step S11 and the subsequent steps are repeated again. Here, $SL_1$ represents a first reference voltage, $SL_2$ represents a second reference voltage, and $0<SL_1<SL_2$.

On the other hand, if anyone of the above three conditions is satisfied, that is, $V_s=0$ (step S15), $V_s<SL_1$ (step S16) or $V_s>SL_2$ (step S17) is satisfied, it is judged that some failure occurs in the antenna 10 containing the line group 16, and the notifying means 33 is set to the notifying state (for example, when the notifying means 33 is LED, it is turned on or turned on/off) (step S19), and then the step S11 and the subsequent steps are repeated again.

Figure 4:
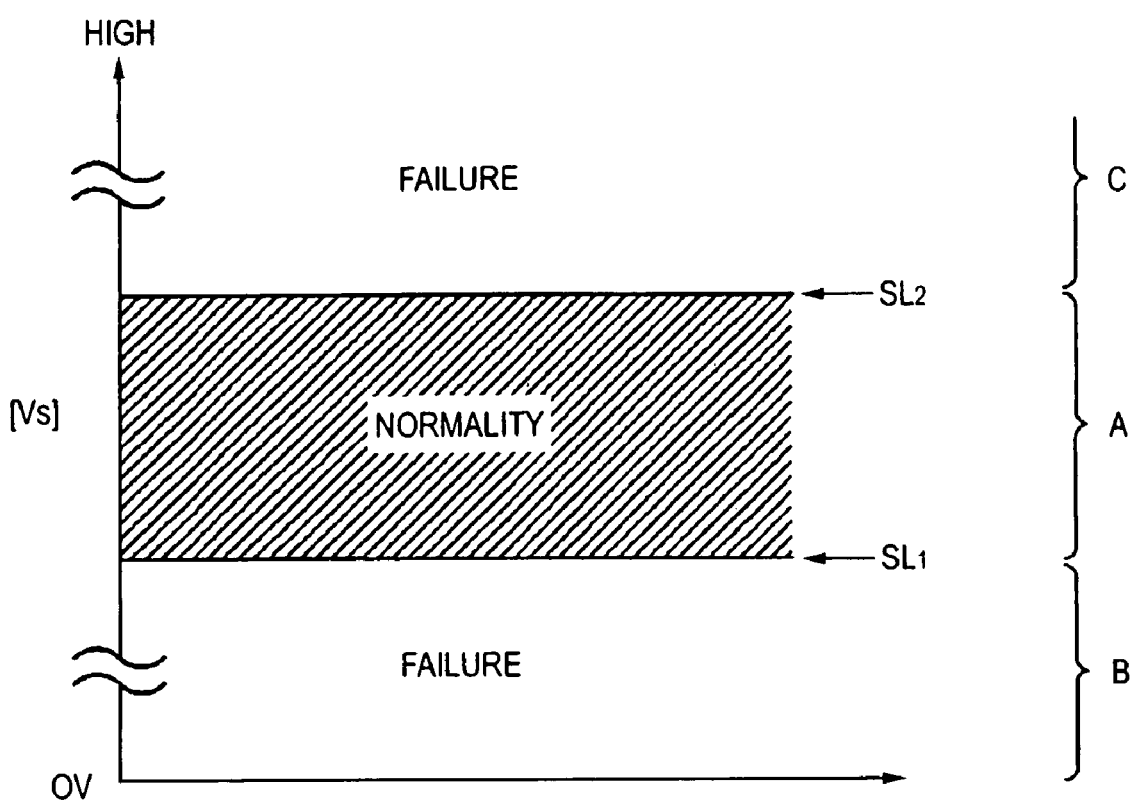
FIG. 4 is a diagram showing the relationship between a failure detection signal $V_s$ and two reference voltages $SL_1$, $SL_2$.

FIG. 4 is a diagram showing the relationship between the failure detection signal $V_s$ and the two reference voltages ($SL_1$, $SL_2$). In FIG. 4, the area a between $SL_1$ and $SL_2$ is a normality-judged area, and an area b from 0 to $SL_1$ and an area c exceeding $SL_2$ are failure-judged areas. The failure detection signal $V_s$ is the voltage across the third resistor 28 when the switching transistor 29 is set to OFF, and this across voltage has the magnitude corresponding to the addition current of the power supply current ($I_1$) flowing through the line 16c of the line group 16 as the common line and the signal current ($I_2$). Therefore, if no failure occurs in the antenna 10 containing the line group 16, the failure detection signal $V_s$ would have the magnitude corresponding to the multiplication of the value $R_{28}$ of the third resistor 28 and the total of the power supply current ($I_1$) and the signal current ($I_2$).

The proper first reference voltage $SL_1$ is lower than the failure detection signal $V_s$ at the normal time by the amount corresponding to a predetermined margin, and the proper second reference voltage $SL_2$ is higher than the failure detection signal $V_s$ at the normal time by the amount corresponding to a predetermined margin. By using the proper two reference voltages ($SL_1$, $SL_2$), the failure detection signal $V_s$ stays between the two reference voltages ($SL_1$, $SL_2$), that is, in the normality-judged area a when no failure occurs in the antenna 10 containing the line group 16.

On the other hand, when some failure occurs in the antenna 10 containing the line group 16, for example, when wire breaking occurs in the line group 16, neither the power supply current ($I_1$) nor the signal current ($I_2$) flows in the third resistor 28. Therefore, the voltage across the third resistor 28 is equal to zero (the failure detection signal $V_s=0$), and the failure judgment condition of the step S15 is satisfied.

Furthermore, in the case of the failure of the antenna 10 breaks down, for example when the coil 18 is broken, the power supply current ($I_1$) does not flow into the third resistor 28, and the voltage across the third resistor 28 is lower than that at the normal time. Therefore, the failure detection signal $V_s<SL_1$ is satisfied, and thus the failure judgment condition of the step S16 is satisfied.

In the case of the internal failure of the amplifier 20, for example when the source of the P-channel MOS-FET 20a and the drain of the N-channel MOS-FET 20b are short-circuited to each other, the power supply current ($I_1$) flowing into the third resistor 28 is extremely increased. Therefore, the voltage across the third resistor 28 is remarkably larger than that at the normal time. Therefore, the failure detection signal $V_s>SL_2$ is satisfied, and the failure judgment condition of the step S17 is satisfied.

The representative failures have been described above, however, any condition of steps S15 to S17 is satisfied in the case of other failures. For example, as predictable failures are considered various kinds of failures such as wire-breaking or short-circuit of the print wire 24 of the electronic board 12, wire-breaking or short-circuit of mount parts such as the first resistor 21, the second resistor 22 and the first capacitor 23, defective solder, solder exfoliation, dropout of the connector 13 of the antenna 10 or the connector 15 of the radio equipment body 14, contact failure, etc. In any failure, the magnitude of the power supply current ($I_1$) flowing in the third resistor 28 and the signal current ($I_2$) is different from the value at the normal time, and thus any one condition of the steps S15 to S17 is satisfied.

As described above, in this embodiment, various failures of the antenna 10 containing the line group 16 can be accurately detected. In addition, in this embodiment, the collector and emitter of the switching transistor 29 are connected to both the ends of the third resistor 28 for taking out the failure detection signal $V_s$, and the switching transistor 29 is set to ON (low-resistance state) at all times out of the failure detection period so that both the ends of the third resistor 28 are short-circuited to each other. Therefore, out of the failure detection period, existence of the third resistor 28 can be neglected. Therefore, there can be achieved an excellent effect that unnecessary loss of the third resistor 28 can be eliminated and the unnecessary power consumption and the loss of the signal current can be avoided.

The present invention is not limited to the above embodiment, and it is needless to say that the present invention contain various modifications and improvements in the scope of the technical idea thereof. For example, different notifying means corresponding to the respective judgment results of the steps S15 to S17 of FIG. 3 may be provided. That is, first notifying means for making a required notification when $V_s=0$ is judged, second notifying means for making a required notification when $V_s<SL_1$ is judged, and a third notifying means for making a required notification when $V_s>SL_2$ is satisfied may be provided. For example, the notification type may be represented by varying the color of light or a blinking pattern or varying the sound.

A part of the operation of FIG. 4 may be modified as follows.

Figure 5A:
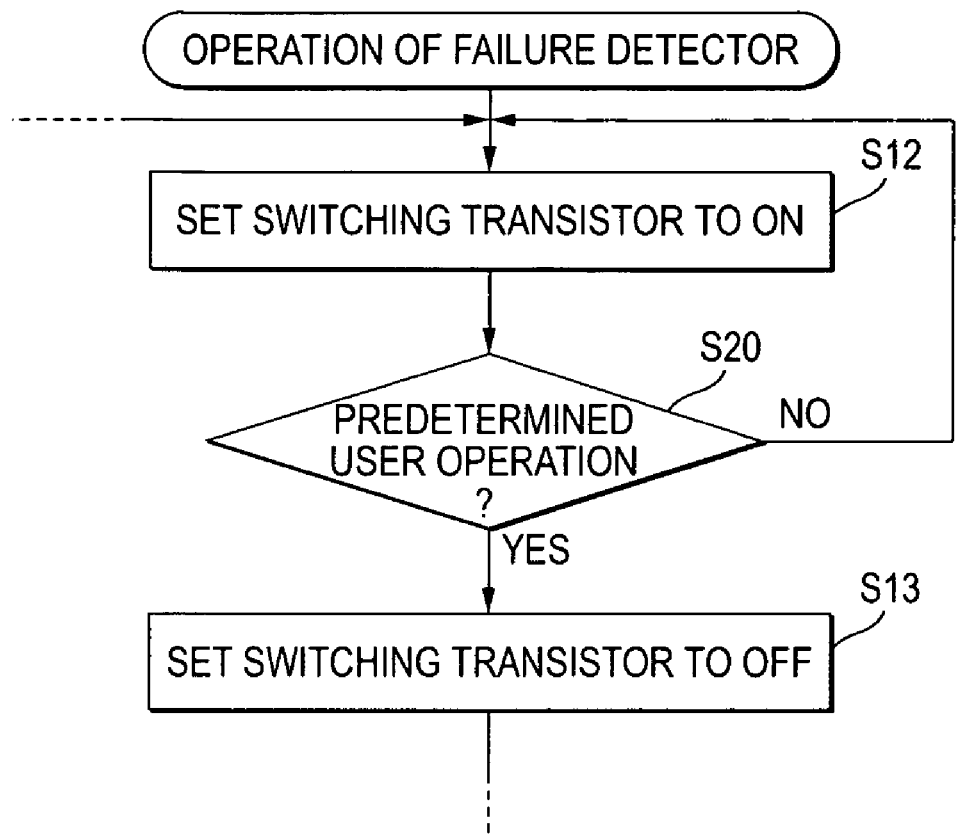
FIGS. 5A and 5B are diagrams showing a first modification and a diagram showing a second modification.

FIG. 5A is a diagram showing a first modification. This modification is different from the operation of FIG. 4 in that immediately after the operation of the failure detector 27 is started, the switching transistor 29 is set to ON (step S12), and this state (the ON state of the switching transistor 29) is kept until a predetermined user operation is carried out.

An example of "predetermined user operation" is as follows. It is now assumed that the radio equipment body 14 and the antenna 10 are mounted in a vehicle such as a car or the like, for example. A "theft preventing device for a vehicle such as a car or the like" or the like may be considered as the in-vehicle mount equipment as described above. In this type vehicle theft preventing device, it is general that the start operation of the theft preventing function (the start operation of detection of a vibration sensor or the like) at the time when the driving of the vehicle is finished is carried out, and the release operation of the theft preventing function (the detection stop operation of the vibration sensor or the like) is carried out when the driving of the vehicle is started. The theft of the vehicle during the period from the start operation till the release operation is prevented.

The start operation and the release operation as described above may be intentionally carried out by operating a switch. However, this operation is cumbersome or the switching operation may be forgotten. Therefore, particularly with respect to the "start operation" necessary for crime-prevention, the theft preventing function may be started by interlocking it with a steering lock. In this case, the theft prevention is started at the time when a key is pulled out (steering is locked). The release of the theft prevention is carried out by a wireless operation using a remote controller in hand.

In the case of the theft preventing device for the vehicle as described above, the "predetermined user operation" is an operation associated with the steering lock. That is, only when an operation associated with the steering lock is carried out, the switching transistor 29 may be set to OFF (step S13) to carry out the failure detection. The operation associated with the steering lock is carried out only when the driving of the vehicle is stopped, and thus the frequency of the failure detection can be reduced without limit. Accordingly, the unnecessary loss by the third resistor 28 can be further eliminated, and the effect of avoiding the unnecessary power consumption and the loss of the signal current can be enhanced at maximum.

Figure 5B:
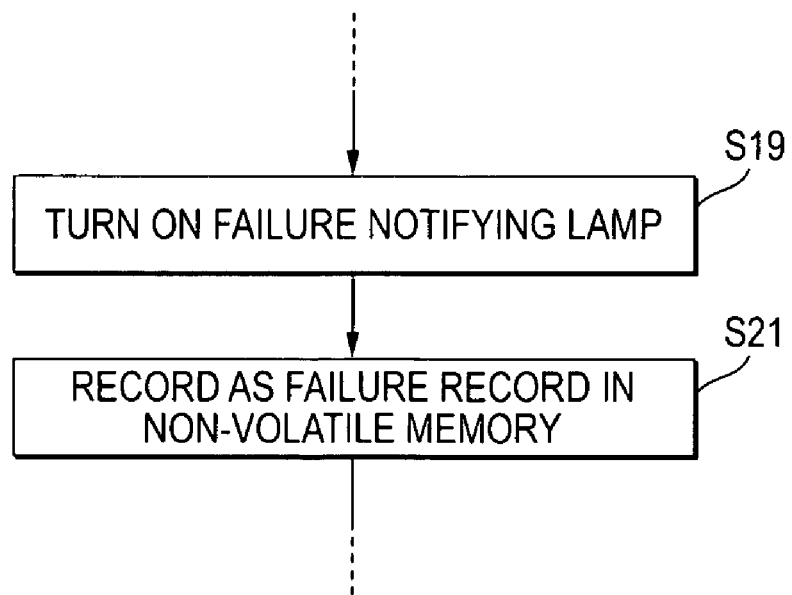
Figure 6:
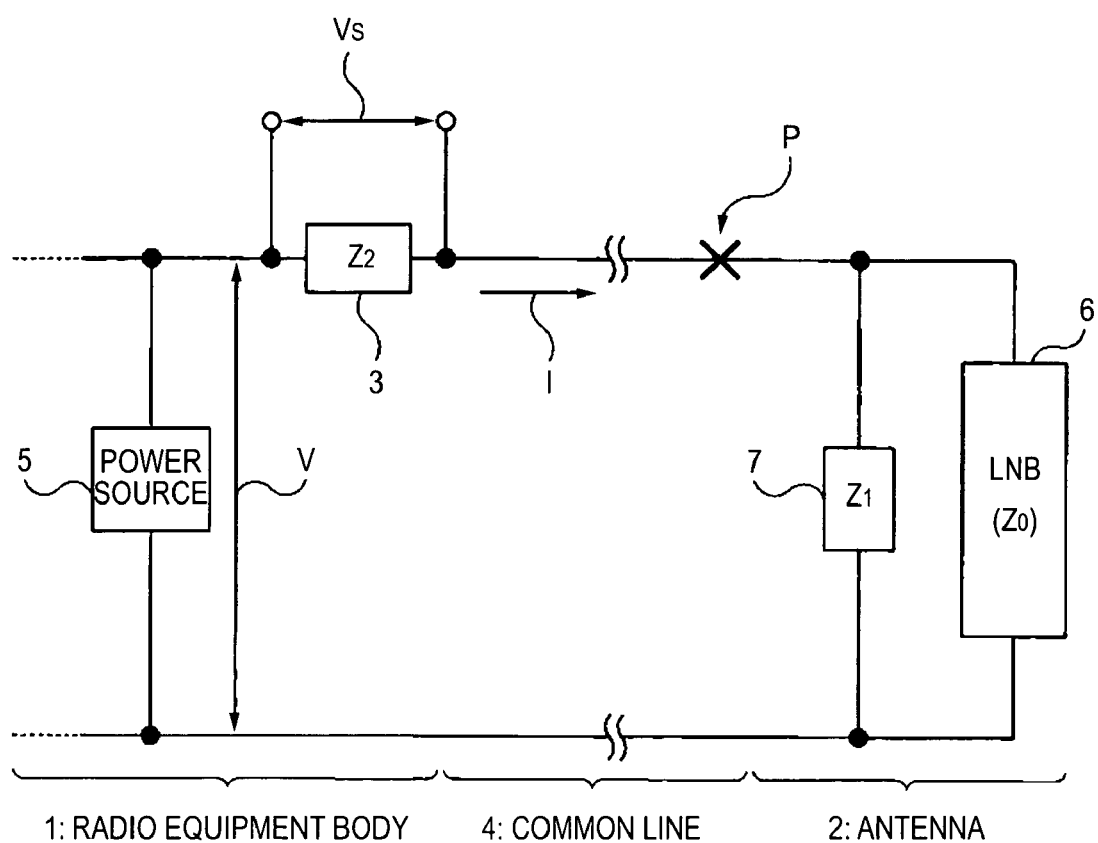
FIG. 6 is a diagram showing the conceptual construction of a related art.

FIG. 5B is a diagram showing a second modification. In this modification, when a failure is judged, the notifying means 33 is set to the notifying state (step S19) and then the data indicating the failure (the date, the type of the failure, etc.) is stored as a failure record in a non-volatile memory (a memory backed up with a battery) (step S21). In this case, the failure record is read out in the case of repair, a failure place can be searched or the like on the basis of the failure record. Accordingly, the efficiency of the failure repair in a factory or the like can be enhanced.

The application of the present invention is not limited to the above example (the theft preventing device mounted in the vehicle). Even when it is applied to a vehicle, it may be applied to another radio equipment mounted in the vehicle (for example, a tire air pressure detecting device, a keyless entry system, other radio applied equipment), and it may be applied to other in-vehicle mount antenna devices. For example, it may be applied to a reception dedicated antenna for receiving public media such as radio broadcast, television broadcast, etc., a transmitting and receiving antenna for carrying out two-way communication such as an automobile telephone, an ETC transceiver, MCA radio equipment, amateur radio equipment or the like.

Furthermore, the present invention may be broadly applied to general radio equipment as well as vehicles. However, since radio equipment to which failure detection is required is considered as radio equipment having relatively high probability of occurrence of failure. Therefore, radio equipment operated under a severe environment such as vibration or the like is suitable as an applied field of the present invention, and a representative thereof is particularly radio equipment mounted in a vehicle. Therefore, in the foregoing description, the theft preventing device of the vehicle is described as an embodiment of the best mode of the present invention. Accordingly, the outer edge of the technical idea of the present invention is general radio equipment, more preferably it is radio equipment operated under a severe environment, and more preferably it is radio equipment mounted in a vehicle (for example, a theft preventing device or the like).

In the foregoing description, the ferrite bar antenna is exemplified as the antenna element, however, the present invention is not limited to it. Furthermore, the same is applied to the signal operating circuit (the amplifier 20 in this embodiment) in the neighborhood of the antenna element. Another type antenna or a signal operation circuit other than the amplifier may be applied. Furthermore, the antenna of this embodiment is used for transmission, however, it may be used for reception or for transmission and reception. Any radio equipment may be used insofar as it has a mechanism of identifying a failure on the basis of current flowing through a common line for power supply and a signal.

What is claimed is:

1. An antenna failure detecting device comprising:
   an antenna element;
   a signal operating circuit for carrying out a signal operation on a reception signal received by the antenna element or a transmission signal transmitted from the antenna element in the neighborhood of the antenna element;
   a common line for multiplexing a power supply voltage of the signal operating circuit and the reception signal signal-operated by the signal operating circuit or the transmission signal supplied to the signal operating circuit and then transmitting the signals thus multiplexed;
   a resistor inserted in the common line;
   switch means that can short-circuit both the ends of the resistor; and
   judging means for judging the presence or absence of a failure of the antenna element, the signal operating circuit or the common line on the basis of the voltage across the resistor.

2. The antenna failure detecting device according to claim 1, further comprising control means for controlling ON/OFF of the switch means is provided, wherein the control means keeps the switch means to ON, and sets the switch means to OFF when the antenna element is not used for communication.

3. The antenna failure detecting device according to claim 1, wherein the antenna element has a coil, a capacitor connected to the coil in series, and a resistor connected to the capacitor in parallel.

4. An antenna failure detecting device comprising:
   an antenna element mounted in a vehicle;
   a signal operating circuit for conducting a signal operation on a reception signal received by the antenna or a transmission signal transmitted from the antenna in the neighborhood of the antenna element;
   a common line for multiplexing a power supply voltage of the signal operating circuit with the signal-operated reception signal by the signal operating circuit or the transmission signal supplied to the signal operating circuit and then transmitting the multiplexed signal;
   a resistor inserted in the common line;
   switch means that can short-circuit both the ends of the resistor;
   judging means for judging the presence or absence of a failure of the antenna element, the signal operating circuit or the common line on the basis of the voltage across the resistor; and
   control means for controlling ON/OFF of the switch means, wherein the control means keeps the switch means to ON and sets the switch means to OFF when the antenna element is not used for communication.

5. The antenna failure detecting device according to claim 4, wherein the antenna element has a coil, a capacitor connected to the coil in series, and a resistor connected to the capacitor in parallel.

6. An antenna failure detecting device comprising:
   an antenna element mounted in a vehicle;
   a signal operating circuit for conducting a signal operation on a reception signal received by the antenna or a transmission signal transmitted from the antenna in the neighborhood of the antenna element;
   a common line for multiplexing a power supply voltage of the signal operating circuit with the signal-operated reception signal by the signal operating circuit or the transmission signal supplied to the signal operating circuit and then transmitting the multiplexed signal;
   a resistor inserted in the common line;
   switch means that can short-circuit both the ends of the resistor, judging means for judging the presence or absence of a failure of the antenna element, the signal operating circuit or the common line on the basis of the voltage across the resistor, and control means for controlling ON/OFF of the switch means, wherein the antenna element, the signal operating circuit, the common line, the resistor, the switch means, the judging means and the control means are constituent parts of a theft preventing device, a tire air pressure detecting device or a keyless entry system of the vehicle, and the control means keeps the switch means to ON and sets the switch means to OFF when a predetermined user operation is carried out on the theft preventing device, the tire air pressure detecting device or the keyless entry system.

7. The antenna failure detecting device according to claim 6, wherein the predetermined user operation is an operation of starting a theft preventing function of the vehicle.

8. The antenna failure detecting device according to claim 7, wherein the judging means contains recording means for recording the judgment result in a non-volatile mode.

9. The antenna failure detecting device according to claim 6, wherein the antenna element has a coil, a capacitor connected to the coil in series, and a resistor connected to the capacitor in parallel.

* * * * *